US009299965B2

(12) United States Patent
Yuhara et al.

(10) Patent No.: US 9,299,965 B2
(45) Date of Patent: Mar. 29, 2016

(54) PRODUCTION DEVICE FOR PACKAGED ELECTRODE AND MANUFACTURING METHOD OF PACKAGED ELECTRODE

(75) Inventors: Hiroshi Yuhara, Yokohama (JP); Takahiro Yanagi, Kawasaki (JP); Manabu Yamashita, Kyoto (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 176 days.

(21) Appl. No.: 14/009,443

(22) PCT Filed: Apr. 6, 2012

(86) PCT No.: PCT/JP2012/059469
§ 371 (c)(1),
(2), (4) Date: Oct. 2, 2013

(87) PCT Pub. No.: WO2012/137903
PCT Pub. Date: Oct. 11, 2012

(65) Prior Publication Data
US 2014/0020238 A1    Jan. 23, 2014

(30) Foreign Application Priority Data

Apr. 7, 2011   (JP) ................................. 2011-085746
Mar. 23, 2012  (JP) ................................. 2012-067816

(51) Int. Cl.
*H01M 10/0583*   (2010.01)
*H01M 2/14*      (2006.01)
(Continued)

(52) U.S. Cl.
CPC .............. *H01M 2/145* (2013.01); *B29C 65/18* (2013.01); *B29C 65/7841* (2013.01); *B29C 65/7894* (2013.01); *B29C 65/80* (2013.01); *B29C 66/1122* (2013.01); *B29C 66/21* (2013.01);
(Continued)

(58) Field of Classification Search
CPC ......................... H01M 2/145; H01M 10/0404
See application file for complete search history.

(56) References Cited

U.S. PATENT DOCUMENTS

| 4,026,000 A | 5/1977 | Anderson |
| 4,337,113 A | 6/1982 | Searle |

(Continued)

FOREIGN PATENT DOCUMENTS

| JP | 53-10029 A | 1/1978 |
| JP | 59-14261 A | 1/1984 |

(Continued)

OTHER PUBLICATIONS

Supplementary European Search Report dated Sep. 4, 2014, 5 pgs.
(Continued)

*Primary Examiner* — Helen O Conley
(74) *Attorney, Agent, or Firm* — Foley & Lardner LLP

(57) ABSTRACT

A production device 100 for a packaged electrode 20 includes a conveyance unit 200 superimposing an electrode 40 and a pair of separators 30 from a front end 51 side of a conveying direction while conveying them, first joining units 300 joining lateral edges 31 of the separators to each other, and second joining units 400 joining at least either front edges 32 or rear edges 33 of the separators to each other. The lateral edges of the separators, superimposed while being conveyed by the conveyance unit, are joined to each other by the first joining units from the front end side of a conveying direction. At least either the front edges or the rear edges of the separators are joined to each other by the second joining units in a state where conveyance is stopped.

11 Claims, 12 Drawing Sheets

(51) Int. Cl.
  *H01G 13/00*    (2013.01)
  *H01M 10/04*    (2006.01)
  *B29C 65/18*    (2006.01)
  *B29C 65/78*    (2006.01)
  *B29C 65/00*    (2006.01)
  *B29C 65/80*    (2006.01)
  B29L 31/34      (2006.01)
  B29C 65/48      (2006.01)
  B29C 65/56      (2006.01)
  B29K 705/00     (2006.01)

(52) U.S. Cl.
  CPC ......... *B29C 66/433* (2013.01); *B29C 66/8161* (2013.01); *B29C 66/81429* (2013.01); *B29C 66/81815* (2013.01); *B29C 66/83543* (2013.01); *B29C 66/9392* (2013.01); *B29C 66/93441* (2013.01); *H01G 13/00* (2013.01); *H01G 13/003* (2013.01); *H01M 10/0404* (2013.01); *B29C 65/48* (2013.01); *B29C 65/56* (2013.01); *B29C 65/7847* (2013.01); *B29C 65/7852* (2013.01); *B29C 66/91421* (2013.01); *B29K 2705/00* (2013.01); *B29L 2031/3468* (2013.01); *Y10T 29/49108* (2015.01); *Y10T 29/53135* (2015.01)

(56) References Cited

U.S. PATENT DOCUMENTS

| | | | |
|---|---|---|---|
| 4,818,340 | A  | 4/1989  | Hasegawa et al. |
| 8,114,537 | B2 | 2/2012  | Kang et al. |
| 2007/0264562 | A1 | 11/2007 | Kang et al. |
| 2011/0189509 | A1 | 8/2011  | Kang et al. |

FOREIGN PATENT DOCUMENTS

| | | |
|---|---|---|
| JP | 62-64056 A    | 3/1987  |
| JP | 3-59948 A     | 3/1991  |
| JP | 5-275073 A    | 10/1993 |
| JP | 3511443 B2    | 3/2004  |
| JP | 2009-009919 A | 1/2009  |
| TW | 200805742     | 1/2008  |

OTHER PUBLICATIONS

Taiwanese Office Action dated Jan. 23, 2014, (6 pgs.).

FIG. 2
(A)
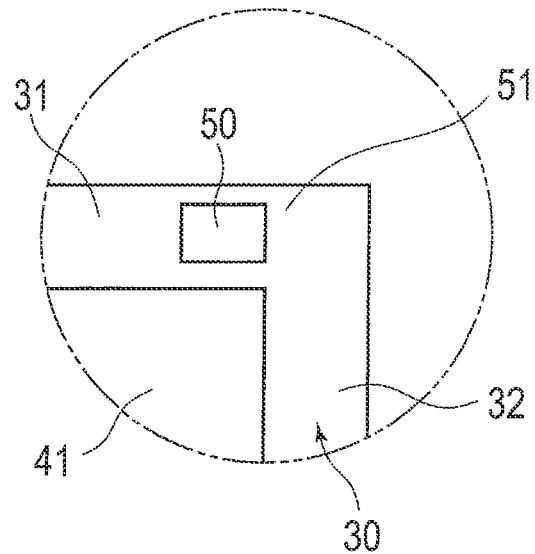
(B)
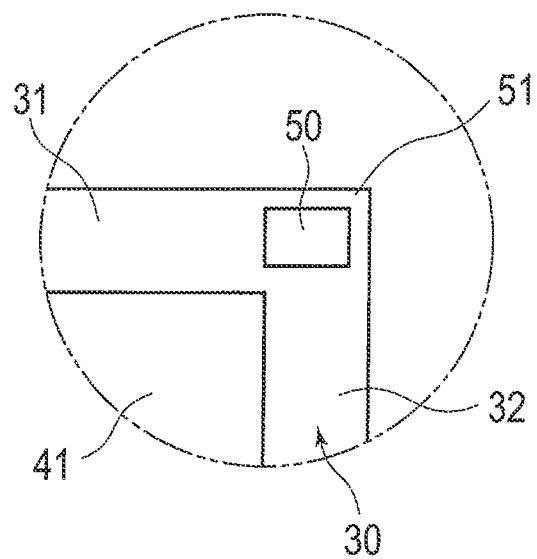

FIG. 9
(A)
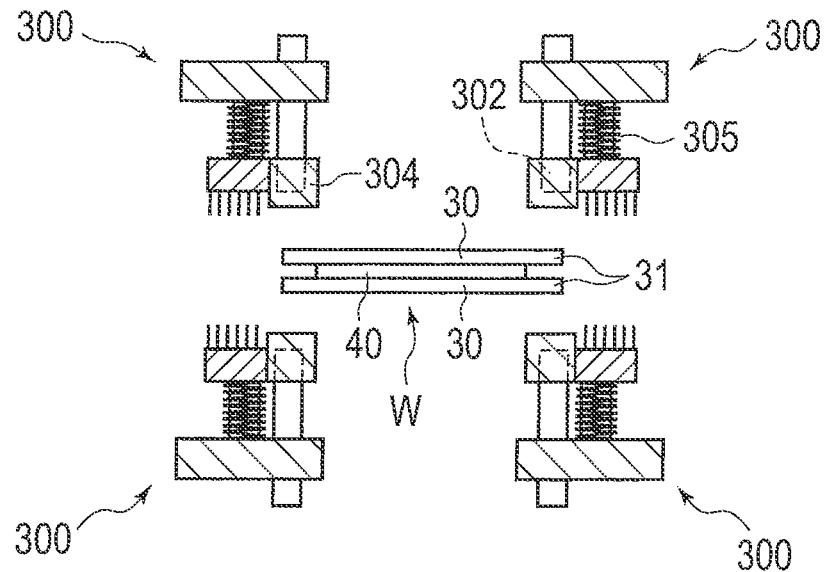
(B)
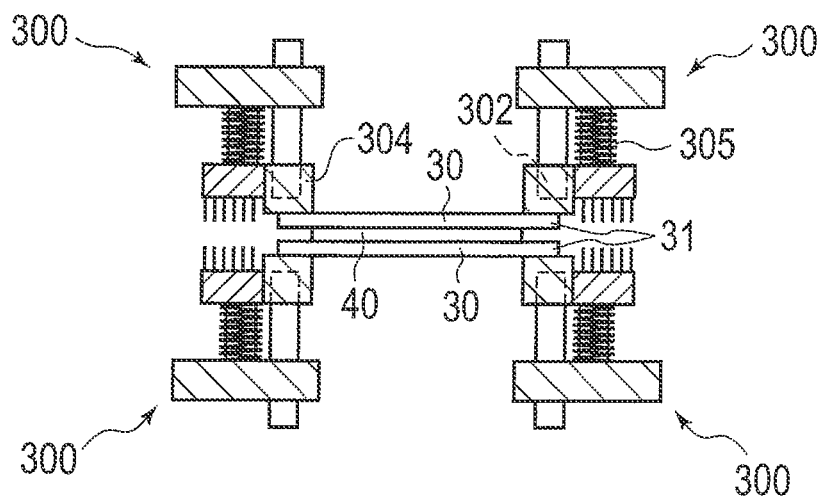

FIG. 10
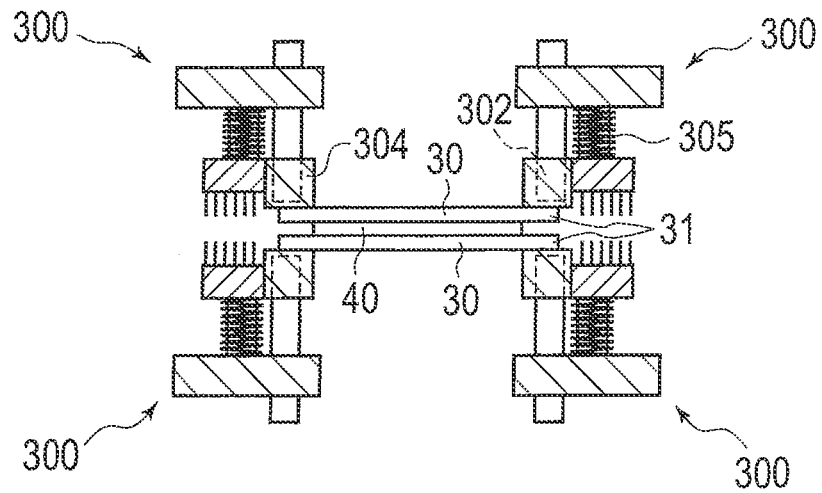
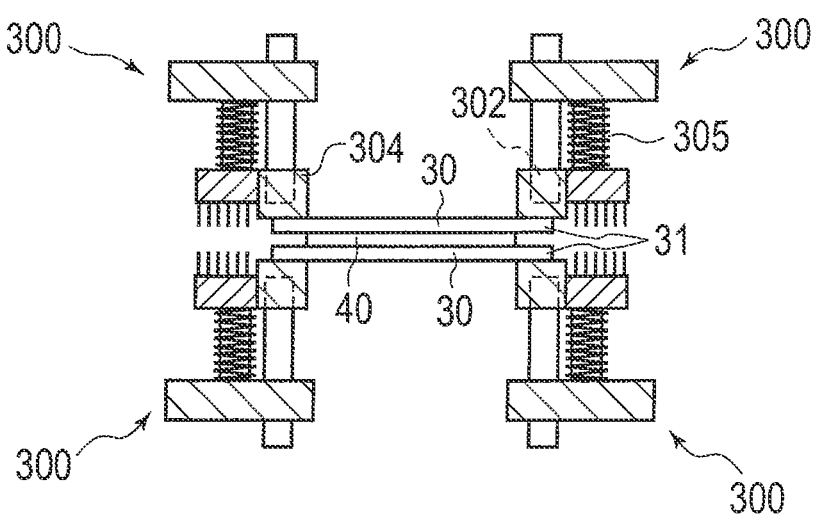

PRODUCTION DEVICE FOR PACKAGED ELECTRODE AND MANUFACTURING METHOD OF PACKAGED ELECTRODE

TECHNICAL FIELD

The present invention relates to a production device for a packaged electrode, and a manufacturing method of a packaged electrode.

BACKGROUND ART

A packaged electrode, which is made by packaging an electrode between a pair of separators, is known (see Patent Literature 1). In this packaged electrode, the separators are joined to each other at least at four corners thereof.

The separators are shaped like thin films, and easily curled up. Since a size of a battery for an electric vehicle and a hybrid vehicle in particular is much larger than a battery for a household appliance, handling is difficult, and it is more likely that separators are not only curled up, but also wrinkled. Therefore, separators are curled up or wrinkled when superimposing the separators on both sides of an electrode, thus making a joining operation for joining edges of the separators more complex. This inhibits improvement of efficiency in manufacturing a packaged electrode, and thus makes it impossible to enhance efficiency in manufacturing an entire battery.

Moreover, separators can be curled up or wrinkled not only when superimposing the separators on both sides of an electrode, but also thereafter. When the separators are curled up or wrinkled during operations thereafter, such as manufacturing of a battery by laminating a positive electrode and a negative electrode, complex operations for collecting the curling and wrinkles are necessary. In order to avoid this, it is preferred that separators are joined to each other not only in two lines that face each other in a planar view, but also in other line.

CITATION LIST

Patent Literature

Patent Literature 1: Japanese Patent No. 3511443

SUMMARY OF INVENTION

In Patent Literature 1, joining locations in a packaged electrode is considered, but a technology for improving manufacturing efficiency is not considered. Although Patent Literature 1 discloses that separators are joined to each other in four lines of the separators in a planar view, a manufacturing technology on the premise of mass production is not considered either.

An object of the present invention is to provide a production device for a packaged electrode, and a manufacturing method of a packaged electrode, by which separators are prevented from being curled up and wrinkled when superimposing the pair of separators on an electrode, and thereafter, so as to improve manufacturing efficiency of the packaged electrode, thereby contributing to improvement of manufacturing efficiency of an entire battery.

A production device for a packaged electrode according to an aspect of the present invention to attain the above-mentioned object is a production device for manufacturing a packaged electrode in which an electrode is sandwiched between a pair of separators. The production device includes a conveyance unit that superimposes the electrode and the pair of separators from a front end side of a conveying direction while conveying the electrode and the pair of separators, a first joining unit that joins lateral edges to each other, the lateral edges being among edge portions of the pair of separators and extending along the conveying direction, a second joining unit that joins at least either front edges or rear edges to each other, the front edges and the rear edges being among the edge portions of the pair of separators and located in the conveying direction, and a controller that controls actuation of the conveyance unit, the first joining unit, and the second joining unit. The controller causes the first joining unit to join the lateral edges of the pair of separators to each other, which are superimposed while being conveyed by the conveyance unit, from the front end side of the conveying direction, and causes the second joining unit to join at least either the front edges or the rear edges of the pair of separators in a state where conveyance by the conveyance unit is stopped.

A manufacturing method of a packaged electrode according to the present invention in order to attain the above-mentioned object is a manufacturing method of manufacturing a packaged electrode in which an electrode is sandwiched between a pair of separators. In the manufacturing method, first, the electrode is packaged by joining lateral edges of the pair of separators from a front end side of a conveying direction while conveying and superimposing the electrode and the pair of separators from the front end side of the conveying direction. Then, at least either front edges or rear edges of the pair of separators are joined to each other in a state where conveyance of the pair of separators is stopped.

BRIEF DESCRIPTION OF DRAWINGS

FIG. 2A and FIG. 2B are planar views showing an enlarged section 2 enclosed by a chain double-dashed line in FIG. 1, and explanatory views used for explaining a location of a "front end" where the pair of separators is joined to each other;

FIG. 9A is a sectional view showing a state before joining heads move closer to each other with respect to a workpiece, and FIG. 9B is a sectional view showing a state where the joining heads have moved closer to each other with respect to the workpiece, and the holding units are in contact with the workpiece;

FIG. 10A is a sectional view showing a state where the holding units are in contact with the workpiece and retracted from an advanced position to a retracted position, and distal ends of joining tips are in contact with the workpiece, and FIG. 10B is a sectional view showing a state where the joining heads are separated from each other with respect to the workpiece from a state shown in FIG. 10A, so that the distal ends of the joining tips are thus separated from the workpiece in a state where the workpiece remains fastened by the holding units;

DESCRIPTION OF EMBODIMENTS

Figure 1:
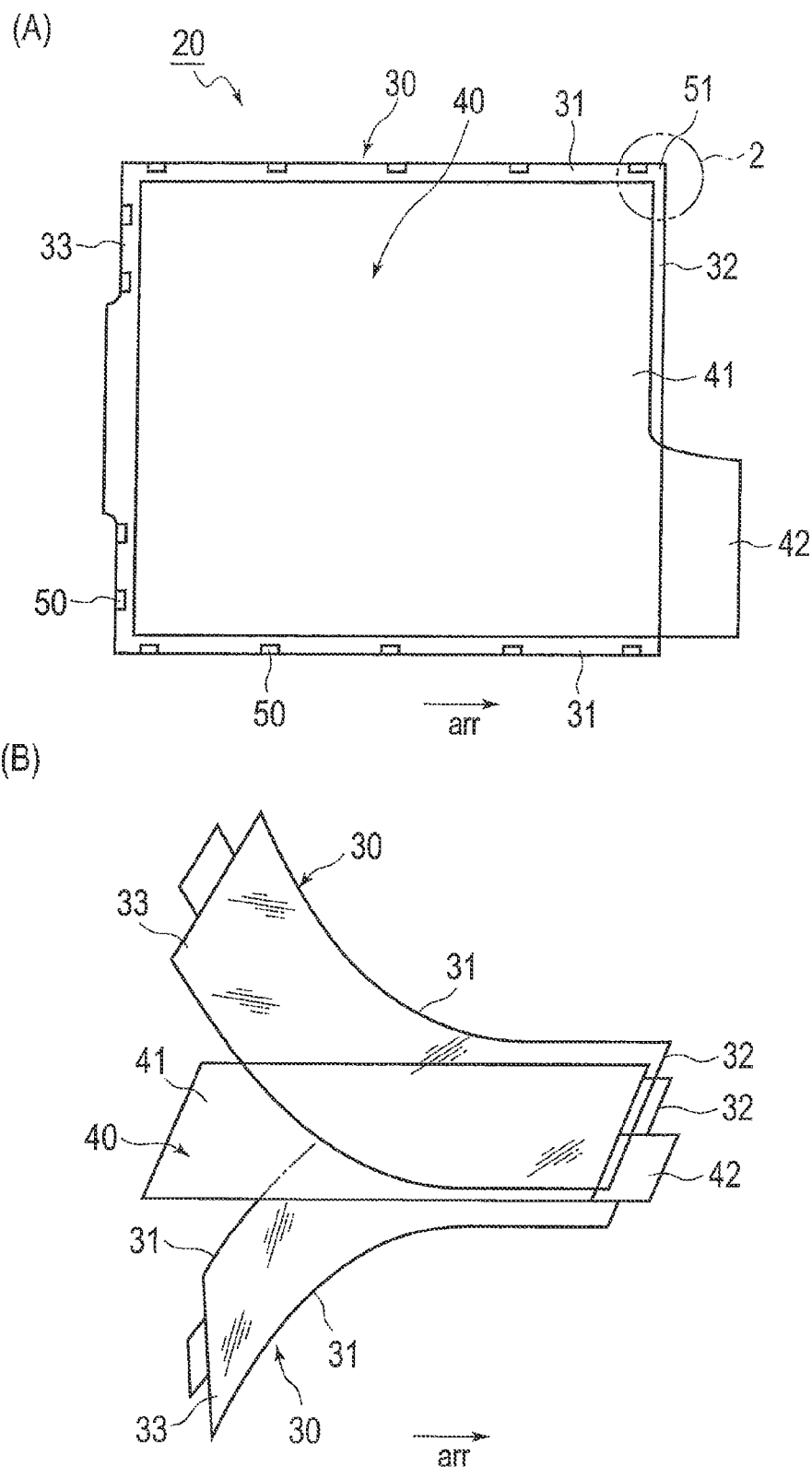
FIG. 1A is a planar view showing an example of a packaged electrode.
FIG. 1B is a perspective view schematically showing how an electrode and a pair of separators are superimposed from a front end side of a conveying direction while the electrode and the pair of separators are conveyed.

An embodiment of the present invention will be explained with reference to the accompanying drawings. In explanations of the drawings, same reference signs are used for same elements to omit duplicated explanation. A dimensional ratio in the drawings is inflated for convenience of explanation, and is different from an actual dimensional ratio.

Figure 3:
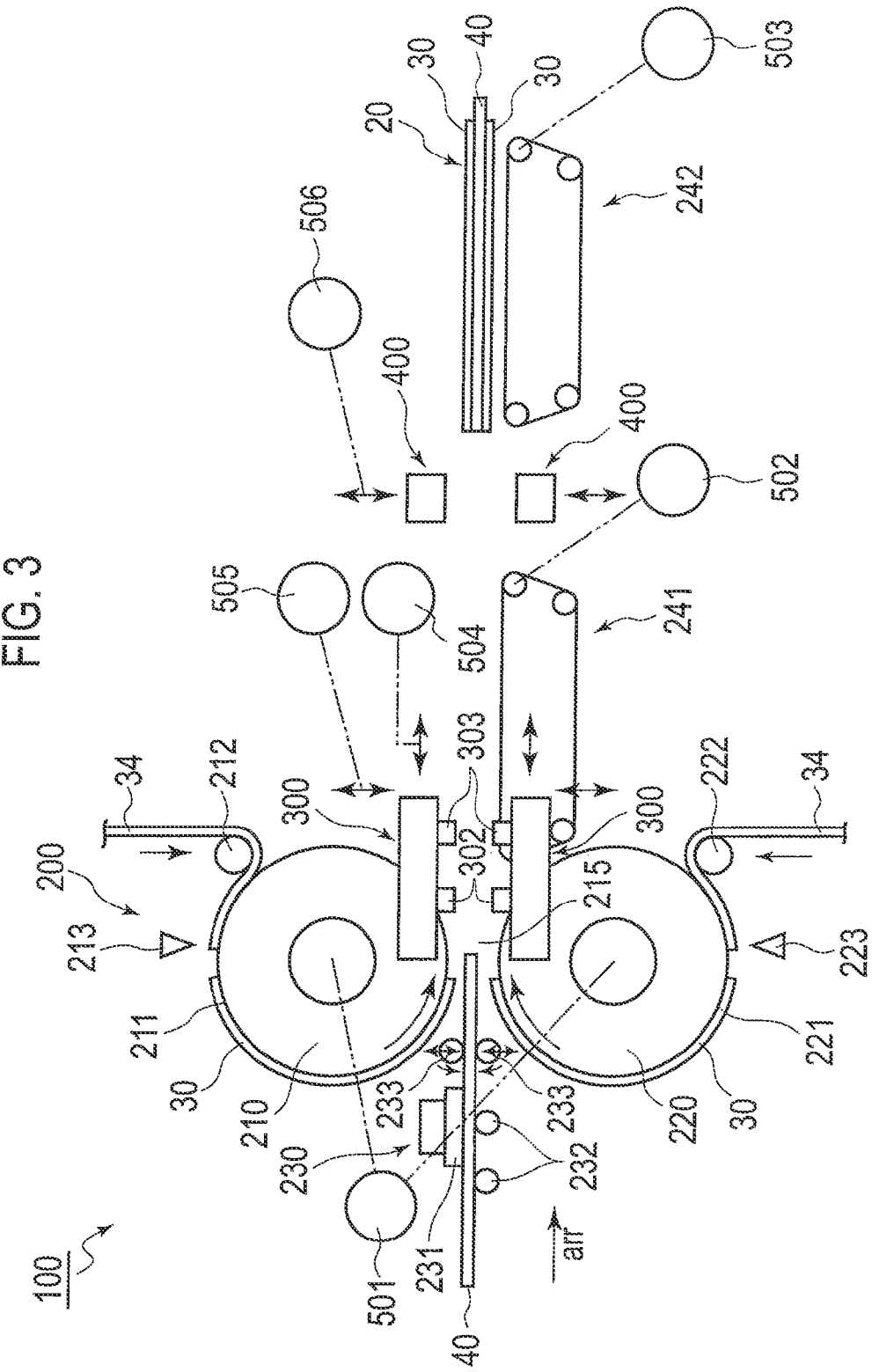
FIG. 3 is a structural view showing a main part of a production device for the packaged electrode.

An arrow arr shown in FIG. 1A, FIG. 1B, and FIG. 3 shows a conveying direction in which an electrode 40 and a pair of separators 30 are conveyed when manufacturing a packaged electrode 20. In FIG. 1A, FIG. 1B, and FIG. 3, a right side in the drawings is a downstream side of the conveying direction and is referred to as "front" in each member, and a left side in the drawings is an upstream side of the conveying direction and is referred to as "rear" in each member. Of edge portions of the separators, edges extending along the conveying direction are referred to as "lateral edges", and edges of the separators located in the conveying direction are referred to as "front edges" and "rear edges". A laminated body, in which the electrode 40 is sandwiched between the pair of separators 30, before joining of the separators 30 is finished, is referred to as a "workpiece W".

As shown in FIG. 1A and FIG. 1B, in the packaged electrode 20, the electrode 40 that is a positive electrode or a negative electrode is wrapped in the pair of separators 30 in a package-like shape. In this embodiment, a positive electrode serves as the packaged electrode 20. The electrode 40 includes a body portion 41 in which an active material is applied on both surfaces of a metallic foil, and a tab 42 that is formed of a part of the metallic foil and electrically connected to other members. The separators 30 are thin films made of a resin material, and slightly larger than the body portion 41 of the electrode 40. Only the body portion 41 of the electrode 40 is sandwiched by the pair of separators 30, and the tab 42 of the electrode 40 is located outside. Lateral edges 31 of the pair of superimposed separators 30 are joined to each other. Also, at least either front edges 32 or rear edges 33 of the pair of superimposed separators 30 are joined to each other. In an example shown in FIG. 1A, the rear edges 33 of the pair of superimposed separators 30 are joined to each other. The number of junction points 50 in the lateral edges 31 is, for example, five, and the number of the junction points 50 in the rear edges 33 is, for example, four.

Positions of "front ends 51", in which the separators 30 are joined to each other, will be explained in the present description with reference to FIG. 2A and FIG. 2B. The "front ends 51", in which the separators 30 are joined to each other, may be set freely in a viewpoint of restraining so-called opening of the superimposed separators 30. For example, positions of the front ends 51 may be positions aligned with the body portion 41 of the electrode 40 (FIG. 2A), or literally in corner portions of the separators 30 (FIG. 2B), as well as positions aligned with a line on which the active material is applied.

As shown in FIG. 3, a production device 100 for the packaged electrode 20 includes a conveyance unit 200 that superimposes the electrode 40 and the pair of separators 30 from the front end 51 side of the conveying direction while conveying the electrode 40 and the pair of separators 30, first joining units 300 by which the lateral edges 31 of the pair of separators 30 are joined to each other, and second joining units 400 by which at least either the front edges 32 or the rear edges 33 of the pair of separators 30 are joined to each other. The lateral edges 31 of the pair of separators 30 that are superimposed while being conveyed by the conveyance unit 200 are joined to each other by the first joining units 300 from the front end 51 side of the conveying direction, and at least either the front edges 32 or the rear edges 33 of the pair of separators 30 are joined to each other by the second joining units 400 in a state where conveyance by the conveyance unit 200 is stopped. In the illustrated example, the rear edges 33 of the pair of separators 30 are joined to each other by the second joining units 400. The details are provided below.

The conveyance unit 200 includes stacking drums 210 and 220 that are a pair of cylindrical rotors that hold the pair of separators 30, respectively, an electrode installation unit 230 arranged on the upstream side of the pair of stacking drums 210 and 220, and a plurality of downstream conveyance units 241 and 242 arranged on the downstream side of the pair of stacking drums 210 and 220. A nip part 215, which sandwiches and holds the workpiece W, is formed between the pair of stacking drums 210 and 220. A dimension of a gap in the nip part 215 is adjusted as appropriate depending on a thickness of the workpiece W. The electrode installation unit 230 sends the electrode 40, which is formed into a given shape, into the nip part 215 along a tangential direction. The plurality of downstream conveyance units 241 and 242 are provided in order to convey the superimposed electrode 40 and the pair of separators 30. In the illustrated example, two downstream conveyance units 241 and 242 are provided, and the second joining units 400 are arranged between the downstream conveyance units 241 and 242.

The electrode installation unit 230 has, for example, an adsorption device 231 which adsorbs and is able to convey the electrode 40, support rollers 232 which support the electrode 40 conveyed by the adsorption device 231, and a pair of conveying rollers 233 which send the electrode 40 into the nip part 215 along the tangential direction. The adsorption device 231 descends vertically and adsorbs the electrode 40, and moves to the downstream side of the conveying direction after ascending while keeping the electrode 40 in an approximately horizontal state. Each of the conveying rollers 233 is provided so as to be able to move closer to each other and be separated from each other with respect to the electrode 40 conveyed by the adsorption device 231, and sandwiches and rotates the electrode 40, thereby sending the electrode 40 into the nip part 215 along the tangential direction. The position of the electrode 40 adsorbed by the adsorption device 231 could be misaligned in the conveying direction or misaligned obliquely to the conveying direction. In the electrode installation unit 230, misalignment of the electrode 40 to be adsorbed and conveyed is detected in advance by a sensor camera, before the electrode 40 is adsorbed by the adsorption device 231. After adsorbing the electrode 40, the adsorption device 231 moves while correcting an orientation of the electrode 40 to an appropriate orientation. Thus, the electrode 40 is conveyed to the nip part 215 in a state where the electrode 40 is in the appropriate orientation.

The pair of stacking drums 210 and 220 are arranged to be paired in a vertical direction, and have a columnar shape, respectively. The pair of stacking drums 210 and 220 are arranged to be perpendicular to the conveying direction across a given gap, and rotating shafts thereof face each other in parallel to each other. Peripheral surfaces of the stacking drums 210 and 220 respectively serve as holding surfaces 211 and 221 that hold the separators 30. The stacking drums 210 and 220 convey the separators 30 that are formed into a given shape, while holding the separators 30 on the peripheral surfaces. A width of the holding surfaces 211 and 221 of the stacking drums 210 and 220 in a direction of the rotating shafts is smaller than a width of the separators 30. The conveyance unit 200 conveys each of the pair of separators 30 in a state where the lateral edges 31 protrude beyond the holding surfaces 211 and 221, respectively.

Means for holding the separators 30 on the holding surfaces 211 and 221 of the stacking drums 210 and 220 is not particularly limited, but suction adsorption or electrostatic adsorption may be applied. For example, in the suction adsorption method, the holding surfaces 211 and 221 have a plurality of air suction holes. By suctioning air from the air suction holes, the separators 30 are held on the holding surfaces 211 and 221.

The pair of stacking drums 210 and 220 rotates in the same direction towards the front of the conveying direction at the nip part 215. In other words, the stacking drum 210 on an upper side conveys the separator 30 stuck on the holding surface 211 towards the nip part 215 by rotating in a counter-clockwise direction in FIG. 3. The stacking drum 220 on the lower side conveys the separator 30 stuck on the holding surface 221 towards the nip part 215 by rotating in a clockwise direction. The pair of stacking drums 210 and 220 are driven and rotated in synchronization by a stacking drum driving motor 501 connected to the rotating shafts. The controller 500 performs rotation control of the stacking drum driving motor 501.

In synchronization with rotation of the stacking drums 210 and 220, the electrode installation unit 230 conveys the electrode 40 in an approximately horizontal state and sends the electrode 40 into the nip part 215 along the tangential direction. Meanwhile, the pair of stacking drums 210 and 220 sends the separators 30 stuck on the holding surfaces 211 and 221 into the nip part 215 with the rotation. Thus, the conveyance unit 200 is able to superimpose and laminate the electrode 40 and the pair of separators 30 from the front end 51 side of the conveying direction while conveying the electrode 40 and the pair of separators 30.

The separators 30 are formed by being cut out from continuous separator members 34 that are let out sequentially from a non-illustrated separator roll. Timing rollers 212 and 222 are arranged in the pair of stacking drums 210 and 220, respectively, and the separator members 34 are sandwiched and held between timing rollers 212 and 222 and the stacking drums 210 and 220, respectively. The controller 500 controls actuation of the timing rollers 212 and 222, and controls timing for sending the separator members 34 to the stacking drums 210 and 220. An upper-side separator cutter 213 is provided above the upper stacking drum 210, and a lower-side separator cutter 223 is provided below the lower stacking drum 220. Once the timing rollers 212 and 222 send the separator members 34 to the stacking drums 210 and 220, the separator members 34 are conveyed while being stuck on the holding surfaces 211 and 221 of the stacking drums 210 and 220. By actuating the separator cutters 213 and 223 at the time when the separator members 34 are conveyed to a given position, the separators 30 having a given shape are cut out from the separator members 34.

The two downstream conveyance units 241 and 242 are structured from, for example, a first conveyer 241 on which the workpiece W, which is sent out from the nip part 215 of the stacking drums 210 and 220, is carried and conveyed, and a second conveyer 242 which is located on the downstream side of the first conveyer 241 and carries and conveys the workpiece W in which joining of the lateral edges 31 of the separators 30 is finished. The second joining units 400 are arranged between the first conveyer 241 and the second conveyer 242. After the rear edges 33 of the pair of separators 30 are joined to each other by the second joining units 400, the second conveyer 242 conveys the manufactured packaged electrode 20 towards a stage where processing of a next process will be carried out. The first and second conveyers 241 and 242 may be structured from, for example, adsorption conveyers. The first and second conveyers 241 and 242 has a width dimension that is smaller than a width of the separators 30, and thus do not interfere with a later-described reciprocating operation of the first joining units 300 (see FIG. 6A). The first and second conveyers 241 and 242 are driven and rotated in synchronization with conveyance of the workpiece W by conveyer driving motors 502 and 503 connected to rollers. The controller 500 performs rotation control of the conveyer driving motors 502 and 503. Conveyers are used as the plurality of downstream conveyance units 241 and 242, but other conveying devices such as adsorption hands may also be used.

The pair of first joining units 300 are provided in a vertical direction, and face each other across a conveying path through which the superimposed electrode 40 and the pair of separators 30 are conveyed, in other words, a conveying path of the workpiece W (see FIG. 5B and FIG. 5C). The pair of second joining units 400 is also provided in the vertical direction, and face each other across the conveying path of the workpiece W (see FIG. 6B). Because the paired separators 30 are joined to each other from both surfaces, more uniform joined states may be created compared to a case where the separators 30 are joined from one surface only. In a case where the separators 30 having different material properties, in particular, thermal properties, is applied, adjustments for optimization of joining conditions are done easily.

In the first and second joining units 300 and 400, means for joining edges of the pair of superimposed separators 30 is not particularly limited, and any means of thermal welding, compression bonding, adhesion, and welding may be applied. In this embodiment, the joining is performed by thermal welding. This is because it is possible to join the resin separators 30 to each other easily.

Figure 5:
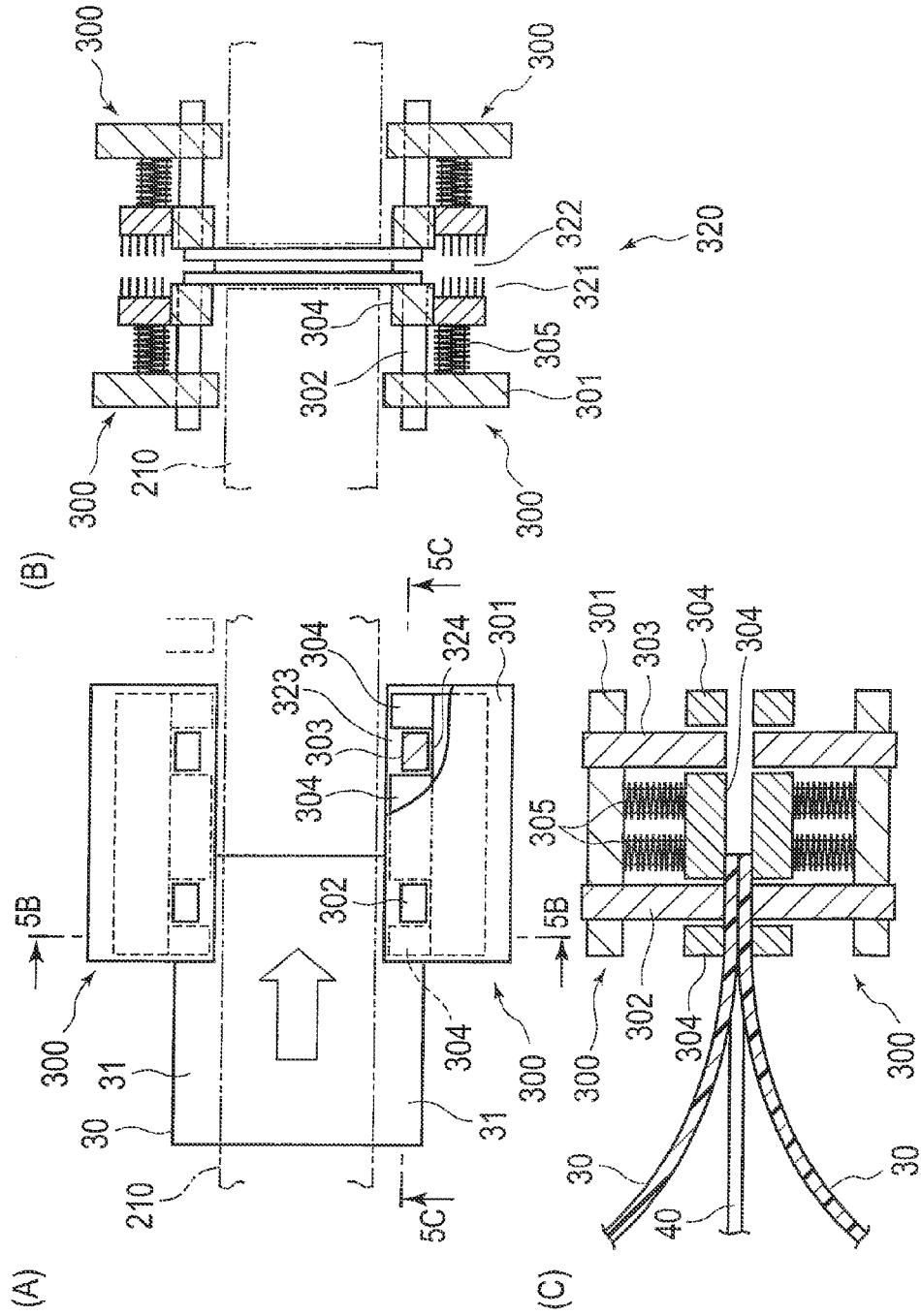
FIG. 5A is a planar view showing first joining units.
FIG. 5B is a sectional view taken along the line 5B-5B in FIG. 5A.
FIG. 5C is a sectional view taken along the line 5C-5C in FIG. 5A, and a view showing a state at the time of a first joining operation by which the front ends of lateral edges of the separators are joined to each other.
Figure 7:
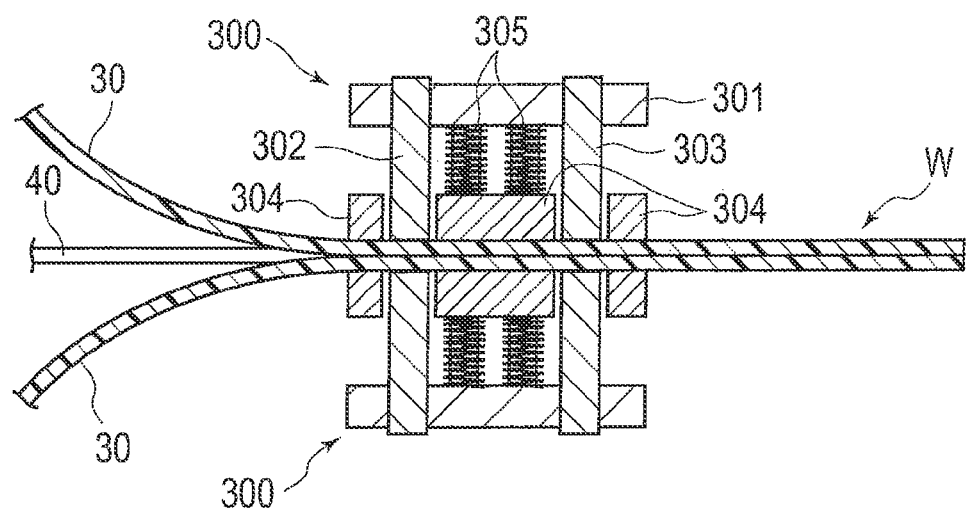
FIG. 7 is a sectional view showing a state at the time of a second joining operation or later by which the lateral edges of the separators are joined to each other by the first joining units.

As shown in FIG. 5 and FIG. 7, the first joining units 300 have joining heads 301 that are able to move closer to each other and be separated from each other with respect to the workpiece W. Joining tips 302 and 303 that join the separators 30 to each other, and holding units 304 that fasten the workpiece W are mounted on the joining heads 301. The holding units 304 are mounted on the joining heads 301 so as to be able to move back and forth between an advanced position beyond distal ends of the joining tips 302 and 303 (FIG. 9A), and a retracted position retracted from the advanced position (FIG. 10A). Between the joining heads 301 and the holding units 304, clamp springs 305 are provided as biasing members which bias the holding units 304 with a biasing force that causes the holding units 304 to move towards the advanced position.

In the first joining units 300 having the foregoing structure, as the joining heads 301 move closer to each other with respect to the workpiece W, the holding units 304 come into contact with the workpiece W and are retracted to the retracted position from the advanced position, and the distal ends of the joining tips 302 and 303 come into contact with the workpiece W and perform the joining (see FIG. 9A, FIG. 9B, and FIG. 10A).

Meanwhile, as the joining heads 301 are separated from each other with respect to the workpiece W from the state where the distal ends of the joining tips 302 and 303 are in contact with the workpiece W, the distal ends of the joining tips 302 and 303 are separated from the workpiece W in a state where the workpiece W remains fastened by the holding units 304 (FIG. 10A, and FIG. 10B). The holding units 304 move forward to the advanced position from the retracted position due to the biasing force of the clamp springs 305 and are separated from the workpiece W.

The first joining units 300 move in a reciprocating fashion between a rear position on a rear side of the conveying direction of the workpiece W (a position indicated by a reference sign P1 in FIG. 11A), and a front position on a front side of the conveying direction of the workpiece W (a position indicated by a reference sign P2 in FIG. 11C). Also, the first joining units 300 move in the vertical direction between a gripping position at which the workpiece W is gripped by the holding units 304 (a position indicated by a reference sign P3 in FIG. 12B), and a release position at which the workpiece W is released from gripping by the holding units 304 (a position indicated by a reference sign P4 in FIG. 12A).

The first joining units 300 are driven by a reciprocating drive mechanism 504 that includes a ball screw, a motor, and so on, so that the first joining units 300 move back and forth between the rear position P1 and the front position P2. The first joining units 300 are also driven by a first vertical drive mechanism 505 that includes a ball screw, a motor, and so on, so that the first joining units 300 move in the vertical direction between the gripping position and the release position. The controller 500 controls actuation of the reciprocating drive mechanism 504 and the first vertical drive mechanism 505. The joining tips 302 and 303 generate heat as electric power is supplied thereto from a first power supply device 507 (see FIG. 4). The controller 500 controls the first power supply device, adjusts temperature of the joining tips 302 and 303 by adjusting a quantity and a period of energization of the joining tips 302 and 303.

The first joining unit 300 includes the first joining tip 302 that joins the lateral edges 31 of the pair of separators 30, and at least one (in the illustrated example, one) second joining tip 303 that is located on the downstream side of the conveying direction compared to the first joining tip 302, and joins the lateral edges 31 of the pair of separators 30. The lateral edges 31 of the separators 30 are joined to each other at the two joining tips 302 and 303. As shown in FIG. 1A, a plurality of (in the illustrated example, five) junction points 50 are formed in the joined separators 30 along the lateral edges 31.

In the first joining, the front ends 51 of the lateral edges 31 of the pair of separators 30 that are superimposed while being conveyed by the conveyance unit 200 are joined to each other by the first joining tips 302 on the upstream side before being conveyed to the second joining tips 303 on the downstream side (see FIG. 5C). The second joining tips 303 on the downstream side perform medium-less striking. In second and third joining after the front ends 51 are joined to each other in the first joining, the lateral edges 31 of the pair of separators 30 conveyed by the conveyance unit 200 are joined to each other by both of the first joining tips 302 and the second joining tips 303 (see FIG. 7). The joining operations are repeated three times in total, thus forming the five junction points 50.

The holding units 304 work as clamp members that sandwich the pair of separators 30 and move together with the joining units. By sandwiching the pair of separators 30 by the holding units 304 working as the clamp members, and moving the joining units, it is possible to convey the pair of separators 30.

Figure 8:
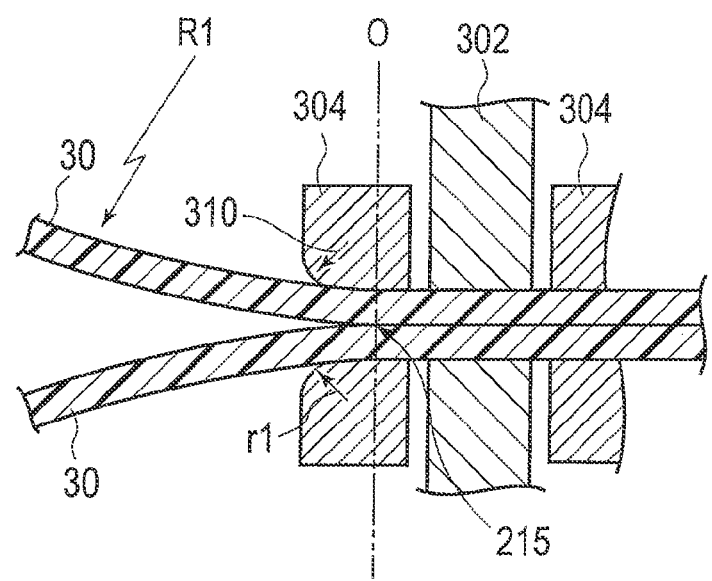
FIG. 8 is a sectional enlarged view showing shapes of holding units in the first joining units.

It is preferred that the holding units 304 have tapered portions 310 that expand towards the upstream side of the conveying direction of the separators 30 (see FIG. 8). This is because conveyance failure, which is caused by collision of distal ends of the conveyed electrode 40 and the separators 30 with the holding units 304, is prevented. A curvature radius r1 in the tapered portions 310 of the holding units 304 is smaller than a curvature radius R1 of peripheral surfaces of the stacking drums 210 and 220, and a curvature of the tapered portions 310 is larger than a curvature of the peripheral surfaces of the stacking drums 210 and 220.

A reference sign O in FIG. 8 indicates a straight line that connects centers of the pair of stacking drums 210 and 220. It is preferred that the nip part 215 is set on the line.

It is preferred that the holding units 304 have heat dissipation means 320. This is because an active material and so on of the electrode 40 are prevented from being affected negatively by heat accumulated in the holding units 304 through the joining.

For example, the heat dissipation means 320 may be structured by using a highly thermal conductive material as a material for forming the holding units 304, or by heat dissipation fins 321 connected to the holding units 304 as shown in the drawings. It is possible to improve heat dissipation efficiency of the holding units 304 easily only by forming the holding units 304 from a highly thermal conductive material such as aluminum. It is possible to enhance heat dissipation efficiency of the holding units 304 even more by using the heat dissipation fins 321 as the heat dissipation means 320.

In the holding units 304, it is preferred that a space 322 is formed around the heat dissipation means 320 for allowing heat to escape. This is because heat dissipation efficiency of the holding units 304 is able to be improved by creating a flow of air as the first joining units 300 move, and dissipating heat that is released from the heat dissipation means 320.

It is preferred that the holding units 304 are formed from wall members 324 which are arranged to surround the first and second joining tips 302 and 303, respectively, and have openings 323 in which the joining tips 302 and 303 are located outside (see FIG. 5A). By arranging the wall members 324 in an angular U-shape, it is possible to allow heat to escape easily and ensure a heat-dissipating property of the holding units 304 while maintaining the original function of the holding units 304, which is fastening of the separators 30.

Figure 6:
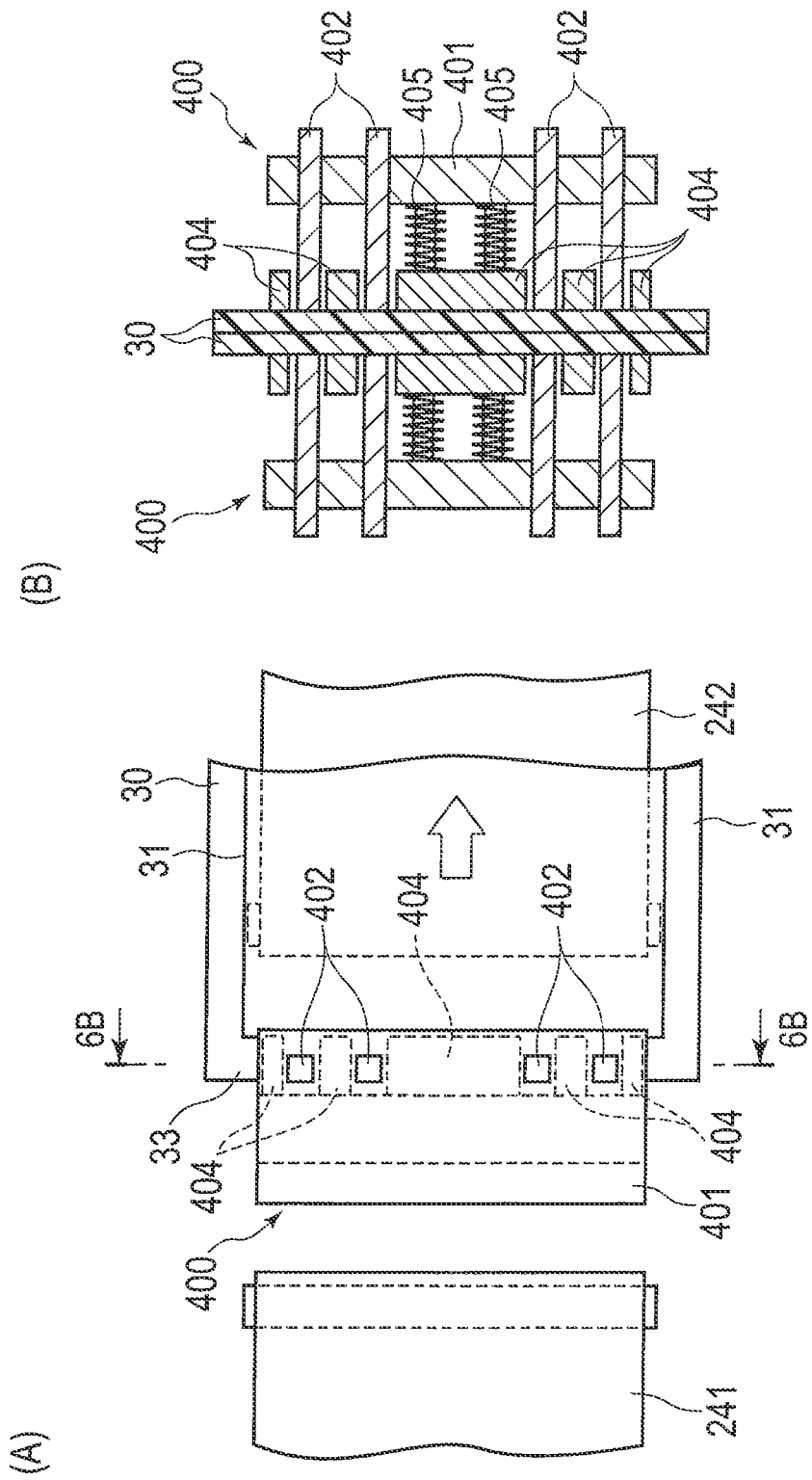
FIG. 6A is a planar view showing a second joining unit.
FIG. 6B is a sectional view taken along the line 6B-6B in FIG. 6A.

With reference to FIG. 6, the second joining units 400 include joining heads 401, joining tips 402, holding units 404, and clamp springs 405 serving as biasing members, similarly to the first joining unit 300. In the second joining unit 400, as the joining heads 401 move closer to each other with respect to the workpiece W, the holding units 404 come in to contact with the workpiece W and are retracted to a retracted position from an advanced position, and distal ends of the joining tips 402 come into contact with the workpiece W. Meanwhile, as the joining heads 401 are separated from each other with respect to the workpiece W from a state where the distal ends of the joining tips 402 are in contact with the workpiece W, the distal ends of the joining tips 402 are separated from the workpiece W in a state where the workpiece W remains fastened by the holding units 404, and the holding units 404 move forward from the retracted position to the advanced position by a biasing force of the biasing members 405 and are separated from the workpiece W.

The second joining units 400 do not move back and forth in the conveying direction of the workpiece W, and only move vertically between a gripping position at which the workpiece W is gripped by the holding units 404, and a release position at which gripping of the workpiece W by the holding units 304 is released.

The second joining units 400 are driven vertically between the gripping position and the release position by a second vertical drive mechanism 506 including a ball screw, a motor, and so on. The controller 500 controls actuation of the second vertical drive mechanism 506. The joining tips 402 generate heat as electric power is supplied thereto by a second power supply device 508 (see FIG. 4). The controller 500 controls the second power supply device, and adjusts temperature of the joining tips 402 by adjusting a quantity and a period of energization of the joining tips 402.

The second joining units 400 are provided with the plurality of (in the illustrated example, four) joining tips 402. The rear edges 33 of the separators 30 are joined to each other by the four joining tips 402. As shown in FIG. 1A, in the joined separators 30, a plurality of (in the illustrated example, four) junction points 50 are formed along the rear edges 33.

Figure 4:
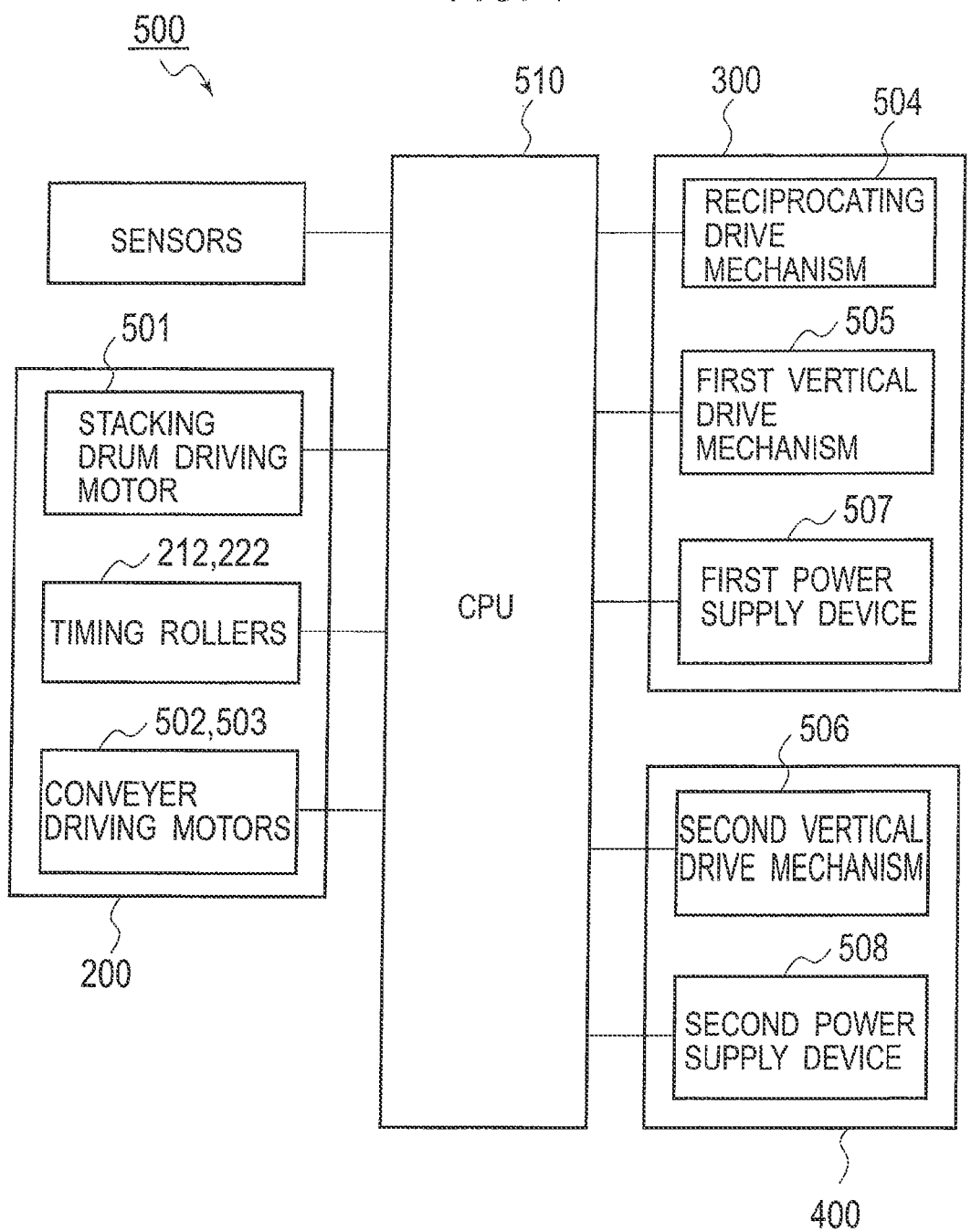
FIG. 4 is a block diagram showing a control system of the production device for the packaged electrode.

As shown in FIG. 4, the production device 100 for the packaged electrode 20 has the controller 500 that controls each unit. The controller 500 is mainly structured from a CPU 510, a memory storing a control program and so on, an operation panel, and so on. Signals from various sensors that detect conveyance positions and orientations of the separators 30 and the electrode 40 are inputted to the CPU 510. The CPU 51 outputs signals to the stacking drum driving motor 501, the timing rollers 212 and 222, and the conveyer driving motors 502 and 503 in the conveyance unit 200 so as to control actuation of the same. The CPU outputs signals to the reciprocating drive mechanism 504, the first vertical drive mechanism 505, and the first power supply device 507 in the first joining units 300 so as to control actuation of the same. The CPU also outputs signals to the second vertical drive mechanism 506, and the second power supply device 508 in the second joining units 400 so as to control actuation of the same.

Figure 11:
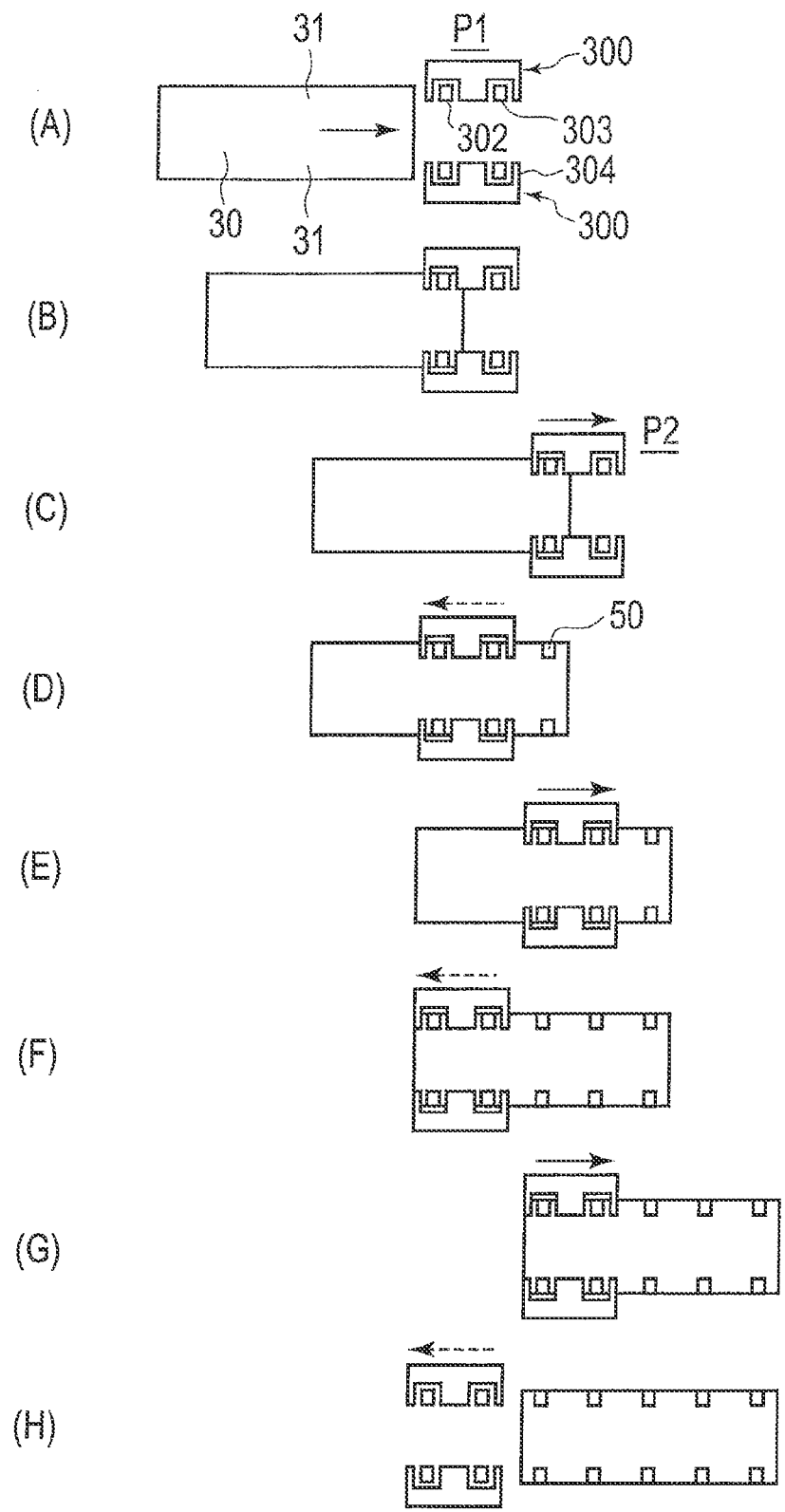
FIG. 11A to FIG. 11H are views schematically showing a reciprocating operation of the holding units in the first joining units.

Actions of the production device 100 for the packaged electrode 20 will be explained with reference to FIG. 11 and FIG. 12.

In FIG. 11A to FIG. 11H, a reciprocating operation of the holding units 304 in the first joining units 300 is shown schematically. In FIG. 12A to FIG. 12G, the first joining operation by the first joining units 300 is shown schematically.

Figure 12:
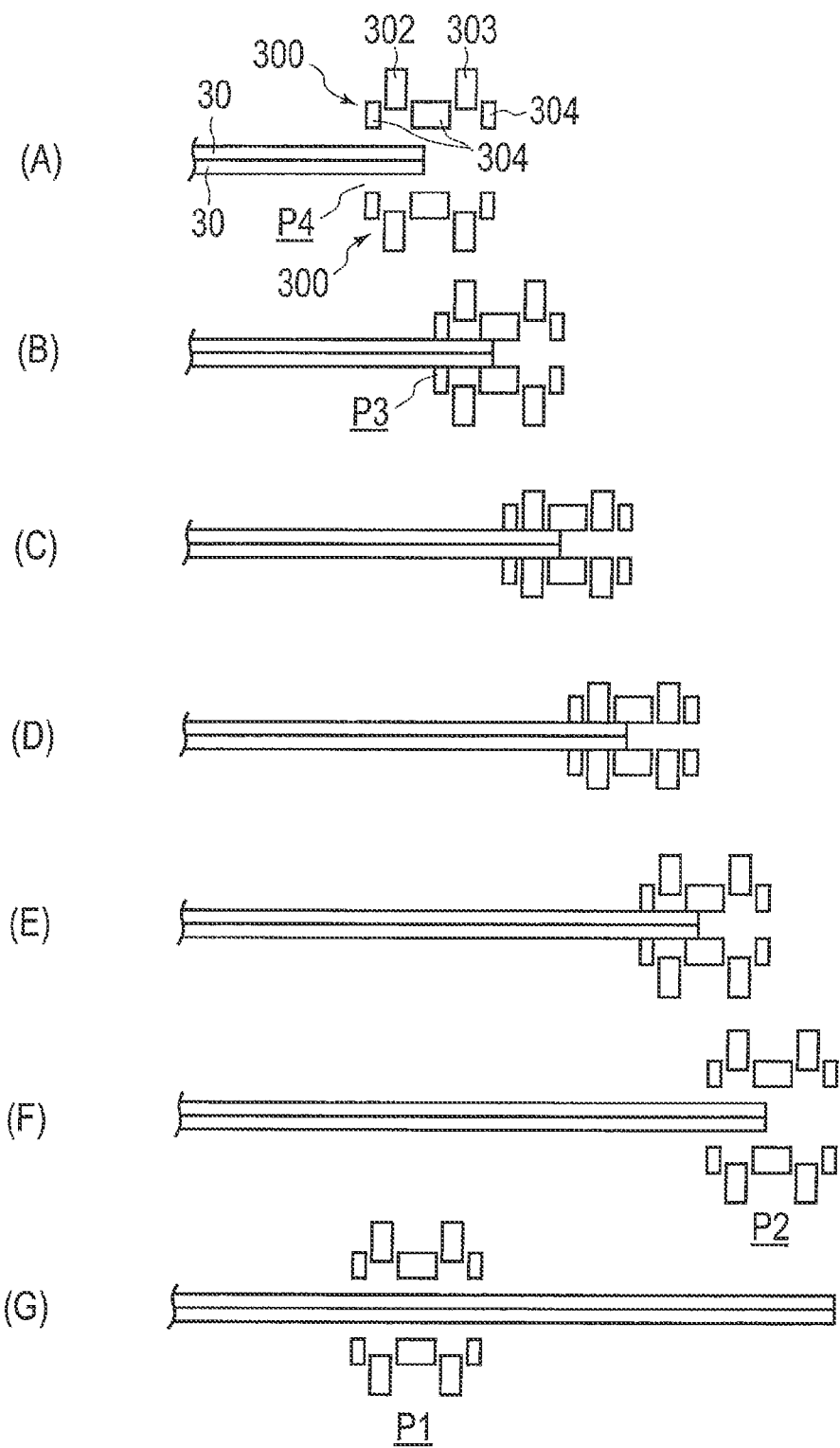
FIG. 12A to FIG. 12G are views schematically showing the first joining operation in the first joining units.

The first joining units 300 move back and forth between the rear position P1 and the front position P2 (FIG. 11A and FIG. 11C), and move vertically between the gripping position P3 and the release position P4 (FIG. 12A, and FIG. 12B). In FIG. 11, a solid arrow represents a forward movement of the first joining units 300, and a dashed arrow represents a retracting movement of the first joining units 300. The first joining units 300 move forward in synchronization with a movement of the separators 30 by the conveyance unit 200. In order to facilitate understanding, FIG. 11B to FIG. 11H show that the first joining units 300 grip and convey the separators 30. Meanwhile, FIG. 12 shows a state that the first joining units 300 move forward in synchronization with conveyance of the separators 30.

First, as shown in FIG. 3, the electrode 40 and the pair of separators 30 are superimposed from the front end 51 side of the conveying direction while being conveyed by the conveyance unit 200. At this time, the electrode 40 is conveyed to the front in an approximately horizontal state by the electrode installation unit 230 in the conveyance unit 200 in synchronization with rotation of the stacking drums 210 and 220, and is sent into the nip part 215 of the stacking drums 210 and 220 along the tangential direction. Also, the separators 30, which are cut out into a given shape, are stuck on the holding surfaces 211 and 221 of the stacking drums 210 and 220, and conveyed to the nip part 215 with rotation by the stacking drums 210 and 220 in the conveyance unit 200.

The upper and lower first joining units 300 are normally open in the vertical direction and located at the release position P4 (FIG. 12A). The first joining units 300 are closed when the separators 30 are conveyed thereto, and grip distal end portions of the lateral edges 31 of the separators 30 (FIG. 11A and FIG. 11B). The first joining units 300 reach the gripping position P3 and grip the separators 30 by using the holding units 304 before the separators 30 pass through the first joining tips 302 on the upstream side and reach the second joining tips 303 on the downstream side (FIG. 12A and FIG. 12B).

While gripping the separators 30, the first joining units 300 move forward up to the front position P2 in synchronization with rotation of the stacking drums 210 and 220 (FIG. 11C). The first joining units 300 join the lateral edges 31 of the pair of separators 30 to each other by using the first joining tips 302 on the upstream side, while moving from the rear position P1 to the front position P2 (FIG. 12C and FIG. 12D). The second joining tips 303 on the downstream side perform medium-less striking (FIG. 12C and FIG. 12D).

Once the first joining is finished, the upper and lower first joining units 300 are open and return to the release position P4, thereby releasing the separators 30 from gripping (FIG. 12E and FIG. 12F). The first joining units 300 move backward up to the rear position P1 (FIG. 11D and FIG. 12G).

The first joining units 300 are closed again, reach the gripping position P3, grip the lateral edges 31 of the separators 30, and move forward up to the front position P2 in synchronization with rotation of the stacking drums 210 and 220 (FIG. 11E). The first joining units 300 join the lateral edges 31 of the pair of separators 30 to each other by using both of the first joining tips 302 and the second joining tips 303 while moving from the rear position P1 to the front position P2.

Once the second joining is finished, the upper and lower first joining units 300 are open, return to the release position P4, and release the separators 30 from gripping. The first joining units 300 move back up to the rear position P1 (FIG. 11F).

The first joining units 300 are closed again, reach the gripping position P3, grip the lateral edges 31 of the separators 30, and move forward up to the front position P2 in synchronization with rotation of the stacking drums 210 and 220 (FIG. 11G). The first joining units 300 join the lateral edges 31 of the pair of separators 30 to each other by using both of the first joining tips 302 and the second joining tips 303, while moving from the rear position P1 to the front position P2.

Once the third joining is finished, the upper and lower first joining units 300 are open, return to the release position P4, and release the separators 30 from gripping. The first joining units 300 move backward up to the rear position P1 (FIG. 11H). As stated above, the first joining units 300 repeats the joining operation for three times in total, and form the five junction points 50. Since the first joining units 300 join the lateral edges 31 of the separators 30 to each other for a plurality of times from the front end 51 side of the conveying direction, it is possible to join the lateral edges 31 of the separators 30 to each other over a wide range.

The workpiece W, which is sent out from the nip part 215 of the stacking drums 210 and 220, is placed on the first conveyer 241 and conveyed. When the joining operations by the first joining units 300 are finished, the front of the workpiece W is placed on the second conveyer 242. After the workpiece W is conveyed by the second conveyer 242, and the rear edges 33 of the pair of separators 30 reach a position of the joining tips 402 of the second joining units 400, conveyance of the workpiece W by the second conveyer 242 is stopped.

In a state where the conveyance of the pair of separators 30 is stopped, the second joining units 400 are closed, reach the gripping position, and grip the rear edges 33 of the separators 30. The rear edges 33 of the pair of separators 30 are joined to each other by the four joining tips 402 while conveyance of the pair of separators 30 remains stopped. The second joining units 400 carry out the joining operation only once, and form the four junction points 50 simultaneously in the illustrated example.

Once joining of the rear edges 33 is finished, the upper and lower second joining units 400 are open, return to the release position, and release the separators 30 from gripping. Thus, joining of the separators 30 of the workpiece W is finished, and the packaged electrode 20 is manufactured, in which the lateral edges 31 and the rear edges of the pair of separators 30 are joined to each other. The second conveyer 242 is driven again, and conveys the manufactured packaged electrode 20 to a stage where processing of a next process is performed.

Thereafter, in a non-illustrated post process, the packaged electrode 20 that is a positive electrode, the negative electrode 40 opposite to the positive electrode, and the packaged electrode 20 that is a positive electrode are laminated alternately, thereby manufacturing a battery cell.

Figure 13:
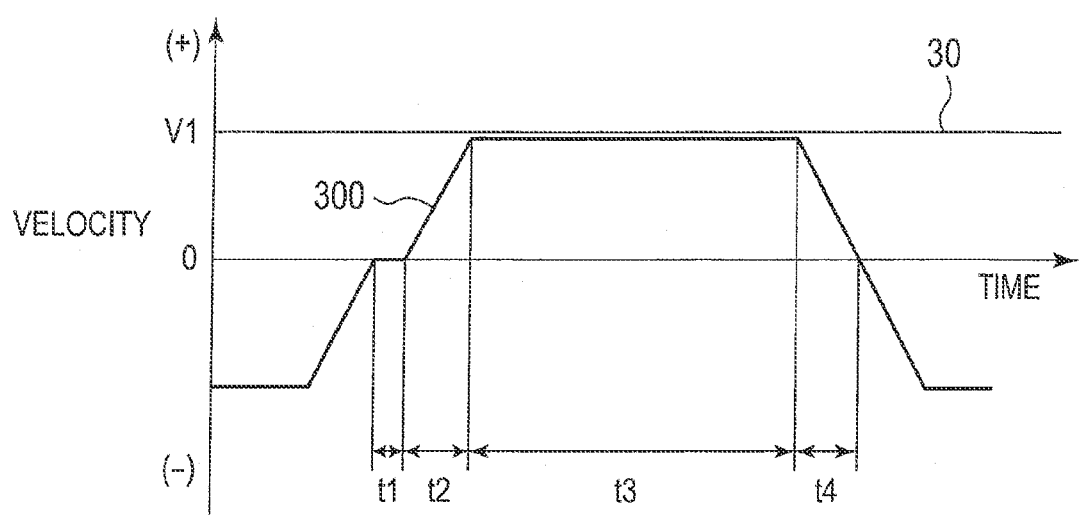
FIG. 13 is a graph schematically showing changes in conveyance speed of the workpiece that is conveyed by cylindrical rotors, and in speed of the first joining units that move back and forth over a plurality of times.

FIG. 13 schematically shows changes in a conveyance speed of the workpiece W that is conveyed by the stacking drums 210 and 220, and a speed of the first joining units 300 that move back and forth for a plurality of times. In FIG. 13, it is defined that the velocities change in a positive direction when moving toward the front of the conveying direction.

The workpiece W that passes through the nip part 215 is conveyed at a speed V1 due to rotation of the stacking drums 210 and 220. Meanwhile, the first joining units 300 are moved back and forth between the rear position P1 and the front position P2 by the reciprocating drive mechanism 504. Time t in the drawing indicates time when the first joining units 300 stand by at the rear position P1 in order to be timed well with conveyance of the workpiece W, and time t2 indicates time when the first joining units 300 start moving back and forth and are accelerating. Time t3 indicates time when the first joining units 300 are moved so that a relative speed between the workpiece W and the first joining units 300 approaches zero, and time 4 indicates time when the first joining units 300 are reducing the speed in order to move backward.

The first joining units 300 join the lateral edges 31 of the superimposed separators 30 to each other while moving together with the workpiece W. The first joining units 300 also repeat the joining from the front end 51 side of the conveying direction for a plurality of times (in this embodiment, three times) while moving. The workpiece W is wrinkled or a joining failure occurs unless the workpiece W and the first joining units 300 move at almost the same speed.

Thus, in this embodiment, the joining is repeatedly performed for a plurality of times from the front end 51 side of the conveying direction while moving the first joining units 300, which join the lateral edges 31 of the pair of separators 30 to each other, so that the relative speed between the workpiece W and the first joining units 300 approaches zero. Since the separators 30 are sequentially welded to each other for a plurality of times from the front end 51 side while being conveyed, it is possible to reduce process time while preventing the separators 30 from opening. It is also possible to perform good joining without causing wrinkles on the workpiece W.

It is preferred that the joining is performed when the moving speed of the first joining units 300 becomes constant. This is because equalizing accelerations of the separators 30 and the first joining units 300 is difficult itself, and it becomes easier to adjust timing for the joining compared to a case where the joining is performed while accelerating the separators 30 and the first joining units 300 concurrently.

The lateral edges 31 of the pair of separators 30, which is superimposed while being conveyed, are joined to each other by the first joining units 300. Thus, it is possible to prevent so-called opening of the pair of separators 30. Also, when superimposing the pair of separators 30 on the electrode 40, curling and wrinkles of the separators 30 do not occur, and the joining operation for joining the lateral edges 31 of the pair of separators 30 to each other becomes easier.

It is preferred that the pair of separators 30 move together with the first joining units 300 while being sandwiched by the holding units 304 that serve as the clamp members. Since it is possible to join the separators 30 to each other while positions of the separators 30 are fixed by the holding units 304, highly accurate joining is performed.

In this embodiment, various operations stated below are realized because the conveyance unit 200, the first joining units 300, and the second joining units 400 have the structures stated above, and further, the controller 500 controls actuation of the conveyance unit 200, the first joining units 300, and the second joining units 400.

While conveying and superimposing the electrode 40 and the pair of separators 30 from the front end 51 side of the conveying direction, the lateral edges 31 of the pair of separators 30 are joined to each other from the front end 51 side of the conveying direction so as to package the electrode 40, and then, the rear edges 33 of the pair of separators 30 are joined to each other in the state where conveyance of the pair of separators 30 is stopped.

Thus, because the lateral edges 31 of the pair of separators 30, which are superimposed sequentially while being conveyed, are joined to each other sequentially by the first joining units 300 from the front end 51 side of the conveying direction, it is possible to prevent so-called opening of the pair of separators 30. When superimposing the pair of separators 30 on the electrode 40, curling and wrinkles of the separators 30 do not occur, and the joining operation for joining the lateral edges 31 of the pair of separators 30 to each other is done easily. Also, since the rear edges 33 of the pair of separators 30 are joined to each other by the second joining units 400, the separators 30 are joined to each other not only in the two lines that face each other in a planar view, but also in an other line. After the pair of separators 30 is superimposed on the electrode 40, curling and wrinkles of the separators 30 do not occur, and no complex operation is required for correcting curling and wrinkles. Thus, curling and wrinkles of the separators 30 are prevented from happening when the pair of separators 30 are superimposed on the electrode 40, and thereafter, thereby achieving more efficient manufacturing of the packaged electrode 20, which contributes to improvement of manufacturing efficiency of an entire battery.

Incidentally, in a case where a product is mass-produced through a number of processes such as various working processes, assembly processes, and inspection processes, a conveyance takt time is determined, and, after processing time in each process is equalized, a work that is processed in the respective processes is moved to a next process. Reducing the number of processes by performing more than one processing within a limit of the determined conveyance takt time so as to achieve improved manufacturing efficiency is an important challenge in mass-production technologies.

Although it is possible to join the rear edges 33 of the pair of separators 30 to each other in a different process, the number of processes is increased, and total manufacturing time may be extended, and it is thus impossible to satisfy a demand for improvement of manufacturing efficiency. The packaged electrode 20 has a form in which the electrode 40 is sandwiched between the pair of separators 30, and the electrode 40 and the pair of separators 30 must be conveyed in synchronization, so conveyance is performed and stopped repeatedly to control timing. By utilizing such conveyance stop time for controlling timing, it is possible to join the rear edges 33 of the pair of separators 30 to each other within a limit of a determined conveyance takt time in the state where the conveyance by the conveyance unit 200 is stopped. Therefore, it is possible to join the rear edges 33 of the separators 30, in addition to the lateral edges 31 of the separators 30, to each other without reducing a speed of packaging the electrode 40 in the pair of separators 30.

The second joining units 400 are arranged between the downstream conveyance units 241 and 242 (between the first conveyer 241 and the second conveyer 242), and the rear edges 33 of the separators 30 are joined to each other in a middle of a conveying route of the superimposed electrode 40 and the pair of separators 30. Thus, it is possible to join the rear edges 33 of the separators 30, which are portions that are used to be superimposed on the stacking drums 210 and 220, to each other, without reducing the speed of packaging the electrode 40 in the pair of separators 30.

The pair of separators 30 is conveyed in a state where the lateral edges 31 protrude beyond the holding surfaces 211 and 221, respectively. Thus, it is possible to arrange the first joining units 300 in regions where the pair of separators 30 are separated from the holding surfaces 211 and 221 of the stacking drums 210 and 220, in other words, side regions of the nip part 215, without interference with the stacking drums 210 and 220. It is possible to perform the joining operation for joining the lateral edges 31 of the pair of the separators 30 to each other from the front end 51 side of the conveying, direction immediately after the pair of separators 30 are superimposed and separated from the holding surfaces 211 and 221. Hence, the front ends 51 of the conveying direction, in which the pair of separators 30 that are superimposed on each other, are joined to each other immediately after the front ends 51 are separated from the stacking drums 210 and 220. When the front ends 51 of the pair of separators 30 are joined to each other, rear edge sides of the pair of separators 30 are conveyed while being sandwiched by the stacking drums 210 and 220. Therefore, it is possible to join the pair of separators 30 while restraining wrinkles and lamination misalignment of the pair of separators 30. Thus, it is possible to prevent so-called opening of the separators 30 more effectively.

The pair of separators 30 are held on the surfaces of a pair of cylindrical rotors, or the stacking drums 210 and 220, respectively, and conveyed towards the electrode 40. Thus, the pair of separators 30 are held and conveyed on arc surfaces, thereby making it easier to superimpose the lateral edges 31 on each other while conveying the pair of separators 30.

The pair of first joining units 300 is provided so as to face each other across the conveying path through which the superimposed electrode 40 and the pair of separators 30 are conveyed. In addition, the pair of second joining units 400 is provided so as to face each other across the conveyance in which the superimposed electrode 40 and the separators 30 are conveyed. Therefore, since the paired separators 30 are joined to each other from both surfaces thereof, it is possible to create a more uniform joined state compared to a case where the joining is performed only from one surface. In a case where the separators 30 having different properties, in particular, thermal properties, are applied, adjustments for optimization of joining conditions are done easily.

The present invention has the following features other than the foregoing.

Among the two joining tips 302 and 303, the first joining tips 302 on the upstream side join the front ends 51 in the lateral edges 31 of the pair of separators 30 to each other before the front ends 51 are conveyed to the second joining tips 303 on the downstream side of the conveying direction, while the electrode 40 and the pair of separators 30 are being superimposed from the front end 51 side of the conveying direction while being conveyed.

Thus, since the front ends 51 in the lateral edges 31 of the pair of separators 30, which are superimposed while being conveyed, are joined to each other by the first joining tips 302 on the upstream side in the first joining units 300, it is possible to prevent so-called opening of the pair of separators 30. When superimposing the pair of separators 30 on the electrode 40, no curling and wrinkles of the separators 30 happen, and the joining operation for joining the lateral edges 31 of the pair of separators 30 to each other is easily done. Therefore, curling and wrinkles of the separators 30 are prevented when superimposing the pair of separators 30 on the electrode 40, thereby making it possible to achieve improvement of manufacturing efficiency of the packaged electrode 20, which contributes to improvement of manufacturing efficiency of an entire battery.

After the joining of the front ends 51 is finished, the lateral edges 31 of the pair of separators 30 that are conveyed are joined to each other by the plurality of joining tips 302 and 303. Since the lateral edges 31 of the pair of separators 30 are joined to each other by the plurality of joining tips 302 and 303, joining time is reduced, thus speeding up manufacturing.

When joining the front ends 51 to each other, the joining may be performed by actuating the first joining tips 302 on the upstream side only. Thus, it is not necessary to actuate the second joining tips 303 on the downstream side when joining the front ends 51 to each other, thereby avoiding medium-less striking by the second joining tips 303 on the downstream side.

The joining heads 301 including the joining tips 302 and 303 that join the pair of separators 30 to each other, and the holding units 304 that fasten the workpiece W are moved closer to each other with respect to the workpiece W, and, after the workpiece W is fastened by the holding units 304, the pair of separators 30 is joined to each other by the joining tips 302 and 303. Then, after the joining heads 301 are separated from each other with respect to the workpiece W, and the joining tips 302 and 303 are separated from the pair of separators 30, the workpiece W is released from clamp by the holding units 304.

Thus, it is possible to perform fastening of the workpiece W by the holding units 304 and joining by the joining tips 302 and 303 within a single process only in one action which is moving the joining heads 301 closer to each other with respect to the workpiece W, thereby reducing cycle time. It thus becomes possible to shorten cycle time required for packaging the electrode 40 between the pair of separators 30, thus improving manufacturing efficiency of the packaged electrode 20, which contributes to improvement of manufacturing efficiency of an entire battery. Since the joining is performed by the joining tips 302 and 303 after the workpiece W is fastened by the holding units 304, it is possible to perform the joining accurately. Moreover, after the joining, the workpiece W is fastened by the holding units 304 until the joining tips 302 and 303 are separated from the workpiece W. Therefore, when the distal ends of the joining tips 302 and 303 are separated from the junction points 50, the joined separators 30 are not peeled off from each other.

Also, the joining is performed repeatedly for a plurality of times from the front end 51 side of the conveying direction, while moving the joining units which join the lateral edges 31 of the pair of separators 30 to each other, so that a relative speed between the workpiece W and the joining units approaches zero.

Thus, since the separators 30 are welded to each other for a plurality of times sequentially from the front end 51 side while being conveyed, it is possible to reduce process time while preventing opening of the separators 30. Also, it is possible to perform good joining without causing wrinkles on the separators 30.

Joining is performed when a moving speed of the first joining units 300 becomes constant. Equalizing accelerations of the separators 30 and the first joining units 300 is difficult itself. Therefore, compared to a case where joining is performed while accelerating the separators 30 and the first joining units 300 concurrently, it becomes easier to adjust timing for joining, and, as a result, joining is performed highly accurately.

MODIFIED EXAMPLES

Although the form was described, in which the rear edges 33 of the separators 30 are joined by the second joining units 400, the front edges 32 or both of the front and rear edges 32 and 33 may be joined by the second joining units 400.

Although the pair of stacking drums 210 and 220 is arranged vertically, the pair of stacking drums 210 and 220 may be arranged in a different direction. The electrode 40 is conveyed along the tangential direction between the stacking drums 210 and 220 (a direction perpendicular to the straight line that connects the centers of the pair of stacking drums 210 and 220). For example, in a case where the stacking drums 210 and 220 are arranged horizontally, the electrode 40 may be conveyed in the vertical direction from above or below.

Although it was described that the single continuous separator member 34 is cut out by the separator cutters 213 and 223 into a given shape in the state of being stuck on the peripheral surfaces of the stacking drums 210 and 220, the separators 30 that are cut out into a given shape in advance may be stuck on the stacking drums 210 and 220 and conveyed.

Although the content of the present invention has been described so far based on the example, the present invention is not limited to the foregoing statements, and it is obvious to those skilled in the art that various modifications and improvements may be made.

The contents of Japanese Patent Application No. 2011-085746 (filed on Apr. 7, 2011), and Japanese Patent Application No. 2012-67816 (filed on Mar. 23, 2012) are herein incorporated herein by reference in their entirety.

INDUSTRIAL APPLICABILITY

According to the embodiment of the present invention, since the lateral edges of the pair of separators, which are superimposed while being conveyed, are joined to each other by the first joining units from the front end side of the conveying direction, it is possible to prevent so-called opening of the pair of separators. When the pair of separators is superimposed on the electrode, no curling and wrinkles of the separators occur, and the joining operation for joining the lateral edges of the pair of separators to each other is done easily. Also, since at least either the front edges or the rear edges of the pair of separators are joined to each other by the second joining units, the separators are joined to each other not only in the two lines that face each other in a planar view, but also in other line. No curling and wrinkles of the separators happen after the pair of separators is superimposed on the electrode, and a complex operation for correcting curling and wrinkles is not required. As stated so far, curling and wrinkles of the separators are prevented from occurring when the pair of separators are superimposed on the electrode and thereafter, and it is thus possible to achieve improvement of manufacturing efficiency of the packaged electrode, thereby contributing to improvement of manufacturing efficiency of an entire battery.

The packaged electrode has a form in which the electrode is sandwiched between the pair of separators, and the electrode and the pair of separators must be conveyed in synchronization, so conveyance is performed and stopped repeatedly. By utilizing the stop time of conveyance in order to control timing, it is possible to join at least either the front edges or the rear edges of the pair of separators to each other within a limit of a determined conveyance takt time, in a state where the conveyance by the conveyance unit is stopped. Therefore, it becomes possible to join at least either the front edges or the rear edges of the separators, in addition to the lateral edges of the separators, without reducing a speed of packaging the electrode in the pair of separators. Therefore, the production device for the packaged electrode, and the manufacturing method of the packaged electrode according to the embodiment of the present invention are industrially applicable.

REFERENCE SIGNS LIST

20 PACKAGED ELECTRODE
30 SEPARATOR
31 LATERAL EDGE
32 FRONT EDGE
33 REAR EDGE
34 FRONT EDGE
40 ELECTRODE
50 JUNCTION POINT
51 FRONT END
100 PRODUCTION DEVICE
200 CONVEYANCE UNIT
210, 220 STACKING DRUMS, CYLINDRICAL ROTORS
211, 221 HOLDING SURFACES
215 NIP PART
230 ELECTRODE INSTALLATION UNIT
241, 242 DOWNSTREAM CONVEYANCE UNITS
300 FIRST JOINING UNIT

301 JOINING HEAD
302 FIRST JOINING TIP, UPSTREAM JOINING TIP
303 SECOND JOINING TIP, DOWNSTREAM JOINING TIP
304 HOLDING UNIT
305 CLAMP SPRING, BIASING MEMBER
310 TAPERED PORTION
320 HEAT DISSIPATION MEANS
321 HEAT DISSIPATION FIN
322 SPACE FOR HEAT DISSIPATION
323 OPENING
324 WALL MEMBER
400 SECOND JOINING UNIT
500 CONTROLLER
W WORKPIECE

The invention claimed is:

1. A production device for a packaged electrode in which an electrode is sandwiched between a pair of separators, comprising:
a conveyance unit that superimposes the electrode and the pair of separators from a front end side of a conveying direction while conveying the electrode and the pair of separators;
a first joining unit that joins lateral edges to each other, the lateral edges being among edge portions of the pair of separators and extending along the conveying direction;
a second joining unit that joins at least either front edges or rear edges to each other, the front edges and the rear edges being among the edge portions of the pair of separators and located in the conveying direction; and
a controller that controls actuation of the conveyance unit, the first joining unit, and the second joining unit, wherein
the controller causes the first joining unit to join the lateral edges of the pair of separators to each other, which are superimposed while being conveyed by the conveyance unit, from the front end side of the conveying direction, and causes the second joining unit to join at least either the front edges or the rear edges of the pair of separators in a state where conveyance by the conveyance unit is stopped.

2. The production device for the packaged electrode according to claim 1, wherein the conveyance unit includes a plurality of downstream conveyance units that convey the superimposed electrode and the pair of separators, and
the second joining unit is arranged between the downstream conveyance units.

3. The production device for the packaged electrode according to claim 1, wherein the conveyance unit has holding surfaces that hold the pair of separators, respectively, a width of the holding surfaces is smaller than a width of the pair of separators, and the conveyance unit conveys the pair of separators in a state where the lateral edges protrude beyond the holding surfaces, respectively.

4. The production device for the electrode according to claim 1, wherein the conveyance unit has a pair of cylindrical rotors which hold the pair of separators, respectively.

5. The production device for the packaged electrode according to claim 1, wherein the pair of the first joining units are provided to face each other across a conveying path through which the superimposed electrode and the pair of separators are conveyed.

6. The production device for the packaged electrode according to claim 1, wherein a pair of the second joining units are provided to face each other across the conveying path through which the superimposed electrode and the pair of separators are conveyed.

7. A manufacturing method of a packaged electrode in which an electrode is sandwiched between a pair of separators, comprising:
bagging the electrode by joining lateral edges of the pair of separators from a front end side of a conveying direction while conveying and superimposing the electrode and the pair of separators from the front end side of the conveying direction; and
joining at least either front edges or rear edges of the pair of separators to each other in a state where conveyance of the pair of separators is stopped.

8. The manufacturing method of the packaged electrode according to claim 7, wherein at least either of the edges are joined to each other in a middle of a conveyance path through which the superimposed electrode and the pair of separators are conveyed.

9. The manufacturing method of the packaged electrode according to claim 7, wherein the pair of separators are conveyed in a state where the lateral edges protrude beyond holding surfaces, respectively.

10. The manufacturing method of the packaged electrode according to claim 7, wherein the pair of separators are held on surfaces of a pair of cylindrical rotors, respectively, and conveyed towards the electrode.

11. A production device for a packaged electrode in which an electrode is sandwiched between a pair of separators, comprising:
conveyance means for superimposing the electrode and the pair of separators from a front end side of a conveying direction while conveying the electrode and the pair of separators;
first joining means for joining lateral edges to each other, the lateral edges being among edge portions of the pair of separators and extending along the conveying direction;
second joining means for joining at least either front edges or rear edges to each other, the front edges and the rear edges being among the edge portions of the pair of separators and located in the conveying direction; and
control means for controlling actuation of the conveyance means, the first joining means, and the second joining means, wherein
the control means cause the first joining means to join the lateral edges of the pair of separators to each other, which are superimposed while being conveyed by the conveyance means, from the front end side of the conveying direction, and causes the second joining means to join at least either the front edges or the rear edges of the pair of separators in a state where conveyance by the conveyance means is stopped.

* * * * *